A. L. GENTER.
METHOD OF WASHING FILTER CAKES.
APPLICATION FILED SEPT. 15, 1917.
1,280,439.
Patented Oct. 1, 1918.
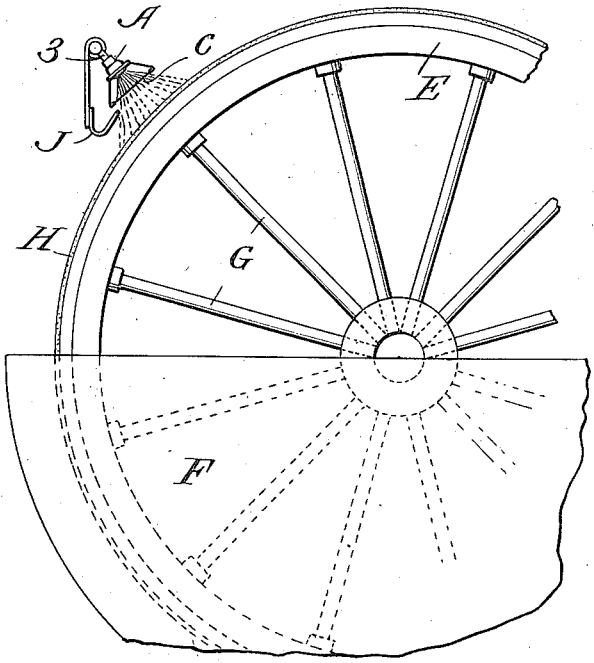
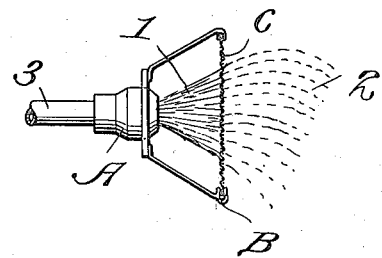
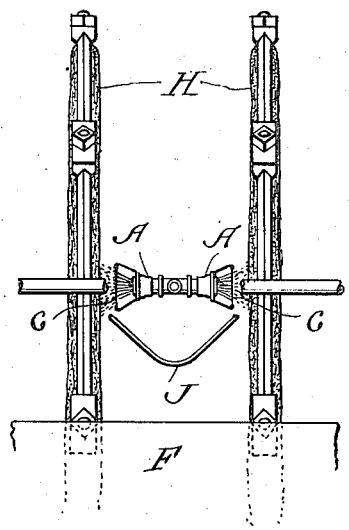
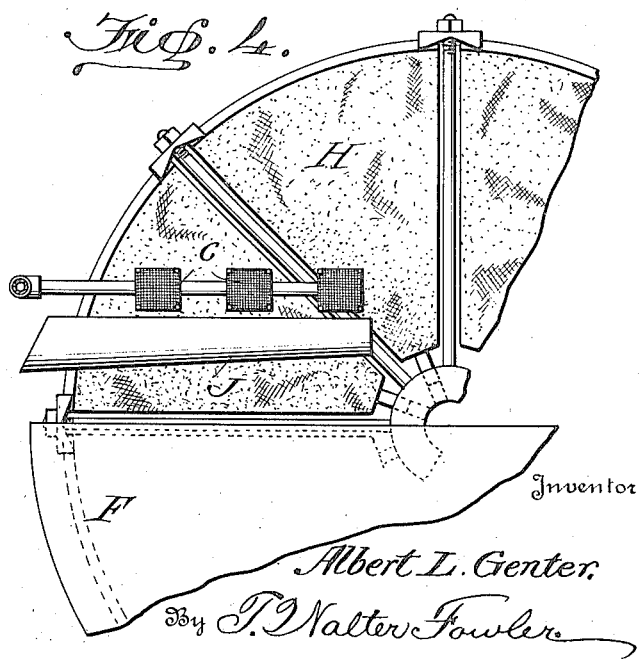
Inventor
Albert L. Genter.
By T. Walter Fowler.
Attorney

UNITED STATES PATENT OFFICE.

ALBERT LEGRAND GENTER, OF SALT LAKE CITY, UTAH, ASSIGNOR TO UNITED FILTERS CORPORATION, OF SALT LAKE CITY, UTAH, A CORPORATION OF DELAWARE.

METHOD OF WASHING FILTER-CAKES.

1,280,439.

Specification of Letters Patent.

Patented Oct. 1, 1918.

Application filed September 15, 1917. Serial No. 191,644.

*To all whom it may concern:*

Be it known that I, ALBERT L. GENTER, a citizen of the United States, residing at Salt Lake City, in the county of Salt Lake and State of Utah, have invented certain new and useful Improvements in Methods of Washing Filter-Cakes, of which the following is a specification.

My invention relates generally to the art of filtration; it is directed specifically to a method of delivering a wash of finely atomized water or other fluid, preferably a liquid, to filter cakes commonly obtained in continuous suction filters and the like.

In revolving drum and leaf-type suction filters, it is common practice to obtain the cakes by immersing the drums or disks covered with some foraminous medium in a bath of the material to be filtered, and connecting the interior of said revolving drums or leaves with a suction means that draws the liquid from the mixture to be filtered through the medium into the interior of said drums or disks while the solids to be separated are deposited on the exterior surface of said drums or disks.

The revolving drum or disk then carries the deposited solids in cake-form out of the bath of material being separated by filtration, and if the suction be continued on the deposit while it is out of the bath, wash-water may be sprayed on to the cake and sucked through same, thus removing all of the soluble values left in the cake.

It is common practice to sprinkle or spray water or other liquids on to the moving cakes while continuing the suction on the portion of the drum or disk directly under the sprayed liquid. It is also common practice in using finely sprayed water delivered by numerous spray nozzles, to keep the spray nozzle at some distance from the cake. The reason for this lies in the fact that sprayed water, no matter how fine, has an impingent velocity sufficient to furrow or wash away portions of the moving filter cake if the spray be held in close proximity to the cake surface.

If the spray nozzle be held some distance from the cake in order to have the sprayed water lose its impingent velocity before striking the cake, losses of sprayed water are occasioned by a certain amount of the atomized water floating off into the surrounding atmosphere. These losses not only mean greater wash-water consumption, but also occasion a wet and sloppy filter station.

The essential object of my invention is to overcome these difficulties and permit placing the spray-nozzles close to the filter cake without any impingent furrowing action taking place on the cake.

Any impediment to the spray jet that will retard its impingent velocity and still permit the passage of the sprayed water, will result in enabling one to place the nozzle much nearer the cake.

In the accompanying drawings forming part of this specification, I illustrate my method of applying this wash to the different types of filters but the invention is not restricted to the two types of apparatus shown, as it is obvious that I may resort to its application to obtain the desired results on any filter or filter-press obtaining filter-cakes with exposed surfaces.

Figure 1 illustrates a side elevation of any ordinary atomizing nozzle and one embodiment of means of retarding the impingent velocity.

Fig. 2 shows the application of my invention to an ordinary drum-filter.

Figs. 3 and 4 show the application of my invention to the disk-type filter.

In Fig. 1, a conical spray effect is produced in the ordinary atomizing nozzle, A. The water or wash-liquid under pressure entering the nozzle through pipe, 3, is given a conical sprayed or atomized effect and issues with considerable impingent force shown at 1. In order to check the jetted velocity of the spray and yet retain an atomized effect, a very fine mesh screen or fabric, C, of metallic wire, or vegetable fabric, or the like, is placed at any desired distance from the nozzle, A. This distance depends greatly on the construction of the nozzle and the pressure behind the sprayed water. It is my intention, however, to place the screen or gauze at such a distance that a maximum atomized effect is retained with a resultant minimum velocity of the atomized liquid.

The friction caused as the jetted or atomized water passes through this screen sufficiently retards the velocity to cause a cloudy or slow floating current of atomized liquid to the right or beyond the gauze, as shown at 2 in Fig. 1. This cloud of spray will not furrow the cake, thus enabling one to place the nozzle close to the cake, H, shown in Figs. 2, 3 and 4.

In Fig. 2, the cake, H, is shown on the surface of ordinary drum filter, E, having suction filtrate arms, G, and being immersed in a tank, F, containing the filter bath.

This spray device may be preferably used, however, in vacuum filters of the disk type, where the cakes are formed on vertical sides of rotating disks as in Figs. 3 and 4. Here the rotating disks with cakes, H, are immersed through the proper suction means in the bath contained in tank, F. In this case, one or two nozzles, A A, may be placed back-to-back with the retarding or gauze device, C, in any desired number between adjacent cakes, thus permitting the delivery of an atomized water or other fluid current at a low velocity, which naturally results in enabling one to construct these disk-type filters with the disks at much closer centers than would be the case if the sprayed fluid had to be delivered to the cake surface from a much greater distance. In operating this device, it may be found that a small percentage of the impeded sprayed fluid particles so catch on the gauze, C, in Fig. 1, that they do not pass through the gauze, but run down the surface of same to a small channel, at B, Fig. 1. In such cases these drops of fluid, as water may be carried off from B to a small trough shown as J in Figs. 2, 3 and 4.

Having thus described my invention what I claim as new and desire to secure by Letters Patent is:—

1. A method of washing a filter cake *in situ*, by means of an atomized fluid current, said method consisting, essentially, in interposing between the source of atomized fluid-supply and the filter cake, an agent having the property of retarding the impinging velocity of the said current against the cake.

2. A method of washing a filter cake *in situ*, by means of an atomized fluid current, said method consisting, essentially, in interposing between an atomizer and the surface of the cake receiving the atomized current, a gauze medium having the property of retarding the impinging velocity of the atomized current without destroying the atomized washing effect thereof.

3. In a method of washing a filter cake *in situ* by means of an atomized fluid current, the step of retarding the impinging velocity of the atomized current without destroying the atomized effect, by interposing a gauze medium between the atomizer and the surface receiving the atomized current.

4. In a method of washing a filter cake *in situ* by means of a sprayed liquid current, the step of retarding the impinging velocity of the said sprayed current without destroying the sprayed effect, by interposing a finely perforated medium between a sprayed generating agent and the surface receiving the sprayed current.

5. A method of washing a filter cake *in situ* by means of an atomized current, said method consisting, essentially, in retarding the impinging velocity of the atomized current without destroying the atomized effect, by placing adjacent the surface receiving the atomized current, a gauze medium through which the current is directed.

6. A method of washing a filter cake by means of a sprayed current, said method consisting, essentially, in retarding the impinging velocity of the sprayed current without destroying the atomized effect thereof.

7. A method of washing a filter cake *in situ* by means of an atomized current and preventing the channeling or burrowing of the filter cake, said process consisting, essentially, in directing an atomized fluid current upon the cake and retarding the impinging velocity of said current without destroying the atomized or sprayed effect, by placing a lightly woven medium between an atomizing nozzle and the cake surface receiving the atomized current.

8. The method herein described of washing a filter cake by means of a sprayed fluid current, said method consisting, essentially, in reducing the impinging velocity of the current by introducing a retarding agent between the spray generator and the surface to be washed.

9. In a filter cake washing device, an atomizer for directing an atomized current toward the filter cake, and means interposed in the path of the said current adapted to retard the impinging velocity of the current against the cake.

10. In a filter cake washing machine, including a device for atomizing a liquid, a means interposed between a filter cake and the atomizing device to retard the velocity of the atomized fluid to prevent said fluid from forcibly impinging upon the cake surface.

11. The method of washing filter cakes in place on a filter element, which includes (1) atomizing the washing fluid and (2) retarding the velocity of such atomized fluid by interposing a retarding medium between the source of supply of said atomized fluid and the surface of the filter cake.

In testimony whereof I affix my signature.

ALBERT LEGRAND GENTER.